United States Patent [19]

Miki

[11] Patent Number: 4,878,813

[45] Date of Patent: Nov. 7, 1989

[54] VACUUM PUMP

[75] Inventor: Masaharu Miki, Narashino, Japan

[73] Assignee: Seiki Seiki Kabushiki Kaisha, Japan

[21] Appl. No.: 165,719

[22] Filed: Mar. 9, 1988

[30] Foreign Application Priority Data

Mar. 18, 1987 [JP] Japan .................................. 62-63282

[51] Int. Cl.⁴ ........................ F04B 23/04; F04B 37/14
[52] U.S. Cl. ...................................... 417/2; 417/247;
417/423.4; 415/90
[58] Field of Search .................... 417/2, 247, 15, 316,
417/423.4, 223; 415/90

[56] References Cited

U.S. PATENT DOCUMENTS

| 4,579,508 | 4/1986 | Tsumaki et al. ................ 415/90 X |
| 4,609,332 | 9/1986 | Miki et al. ................... 417/423.4 X |
| 4,655,678 | 4/1987 | Miki .......................... 415/90 X |
| 4,717,315 | 1/1988 | Miki et al. ................... 417/423.4 X |
| 4,732,529 | 3/1988 | Narita et al. ................. 415/90 |
| 4,734,018 | 3/1988 | Taniyama et al. .............. 417/423.4 |

FOREIGN PATENT DOCUMENTS

| 3531942 | 4/1986 | Fed. Rep. of Germany ........ 415/90 |
| 60-182394 | 9/1985 | Japan ........................ 415/90 |

OTHER PUBLICATIONS

Soviet Inventions Illustrated, Week 8401, Section P/Q, Abstract No. 84-004833/01, Derwent Publications Ltd, London, GB; & SU-A-1 000 602 (Bashkir Oil Ind.) 05-03-1983.

Primary Examiner—Carlton R. Croyle
Assistant Examiner—Eugene L. Szczecina, Jr.
Attorney, Agent, or Firm—Bruce L. Adams; Van C. Wilks

[57] ABSTRACT

A vacuum pump producing ultra high vacua has a housing containing a first set of rotor blades provided around a first rotor for producing ultra high vacua and a second set of rotor blades provided around a second rotor for producing low to high vacua wherein the first rotor and the second rotor are magnetically suspended during pump operation. The first rotor is disconnected from the second rotor during pump operation in a low to high vacuum range, and it is connected with the second rotor as the pump operation shifts from a high vacuum range to an ultra high vacuum range. Because of this feature, the pump operation ranging from a low vacuum range up to an ultra high vacuum range can be performed by a single pump.

11 Claims, 3 Drawing Sheets

VACUUM PUMP

FIELD OF THE INVENTION

The present invention relates to vacuum pump and, in particular to a vacuum pump which can produce a high degree of vacuum or ultra vacuum.

BACKGROUND OF THE INVENTION

Conventionally, an oil-sealed rotary vacuum pump is required in addition to a turbo molecular pump to obtain an ultra high vacuum. Therefore, the drawback is that a large area is required for pump installation and a back migration of oil components from an oil-sealed rotary vacuum pump towards an inlet port deteriorates the vacuum.

SUMMARY OF THE INVENTION

The present invention is provided in view of the above mentioned problems of the prior art, and an object of the invention is to provide an oil-free vacuum pump, which can provide a high degree of vacuum by itself at low cost without requiring a large installation area. A first set of rotor blades for producing ultra high vacuum and a second set of rotor blades for producing a relatively low vacuum are coaxially provided in a housing. The second set of rotor blades is rotationally driven by a motor. The first set of rotor blades is disconnected from the second set of rotor blades during pump operation in a low to high vacuum range, and the first set of rotor blades is connected to the second set of rotor blades during pump operation in an ultra high vacuum range. Therefore, pump operation can be continuously carried out by one vacuum pump from a low vacuum range (e.g. atmospheric pressure) to an ultra high vacuum range.

DETAILED DESCRIPTION OF PREFERRED EMBODIMENTS

Figure 1:
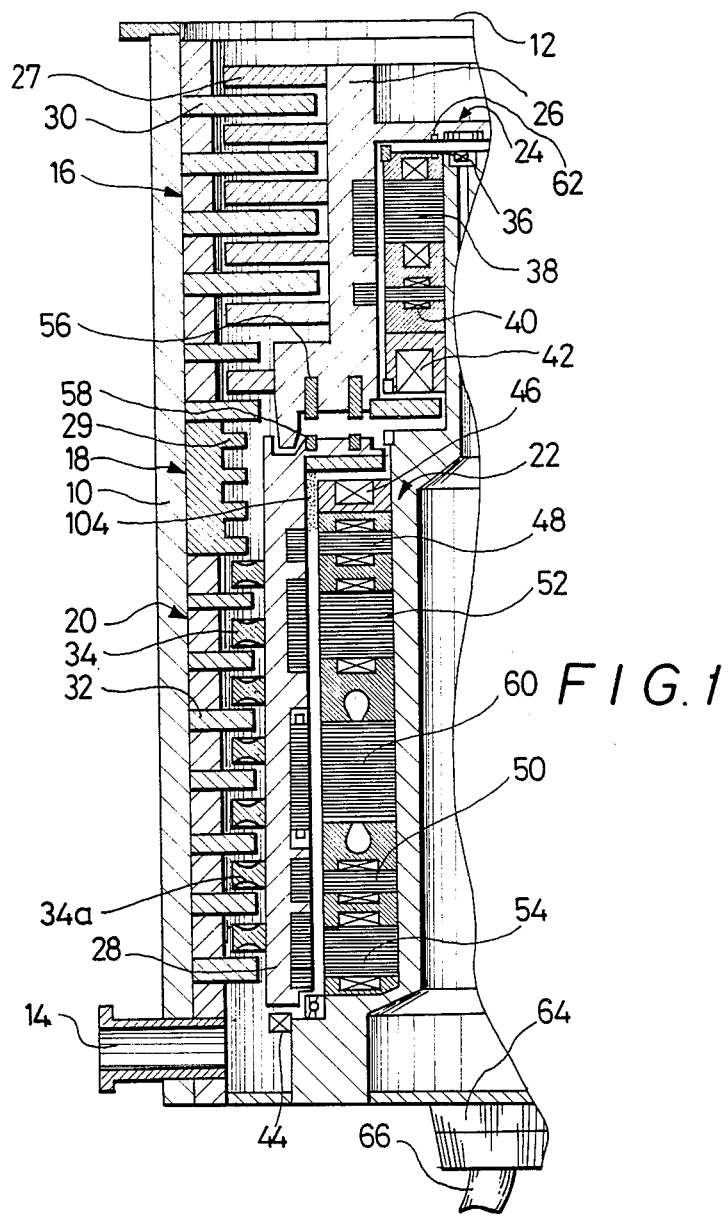
FIG. 1 illustrates a partial cross-section of a pump body to which the present invention is applied.

Preferred embodiments of the vacuum pump according to the invention are herein described herein with reference to the drawings. FIG. 1 illustrates a half of the cross section of a pump in which the present invention is employed. An inlet port 12 and an outlet port 14 are respectively provided at the top side and the bottom side of an outer cylinder 10 of the pump.

The interior of the pump body is divided, in the direction from the inlet port 12 to the outlet port 14, into a turbo molecular pump portion 16, a stationary helical groove portion 18 and a centrifugal blade portion 20. The turbo molecular pump portion 16 is provided for ultra high vacuum, the stationary helical groove portion 18 is for high to intermediate vacuum, and the centrifugal blade portion 20 is for low vacuum.

A rotor 24 supported by a tower 22 within the outer cylinder 10 is divided into a first internal cylinder or a first rotor 26 for the turbo molecular pump portion 16, and a second internal cylinder or a second rotor 28 for the stationary helical groove portion 18 and the centrifugal blade portion 20. The first rotor and the second rotor can rotate independently of each other.

Multiple stage rotor blades 27 are provided on the external periphery of the first internal cylinder 26. They are disposed alternately with stator blades 30 provided on the internal periphery of the outer cylinder 10. A stationary helical groove 29 is provided on the internal periphery of the external cylinder 10 which faces the external periphery near the top end of the second internal cylinder 28. Stator blades 32 are provided in plural, stages under the stationary helical groove 29. On the outer periphery of the second internal cylinder, multiple stage centrifugal blades 34 are provided alternately with these stator blades 32. The above mentioned first internal cylinder 26 and second internal cylinder 28 are magnetically floated. Since they are magnetically floated, with a position sensor 36 is provided for detecting axial displacement of the first internal cylinder 26; a radial direction electromagnet 38 is provided for controlling radial direction displacement of the first internal cylinder 26; a position sensor 40 is provided for detecting radial direction displacement of the first internal cylinder 26; an axial direction electromagnet 42 for controlling axial direction displacement of the first internal cylinder 26; a position sensor 44 is provided for detecting axial displacement of the second internal cylinder 28; an axial direction electromagnet 46 is provided for controlling axial direction displacement of the second internal cylinder 28; position sensors 48 and 50 are provided to for detecting radial direction displacement of the second internal cylinder 28, and radial direction electromagnets 52 and 54 are provided for controlling radial direction displacement of the second internal cylinder 28.

Further, in the bottom end face of the first internal cylinder 26 and in the top end face of the second internal cylinder 28, permanent magnets 56 and 58 which pull to each other are respectively provided.

Figure 2:
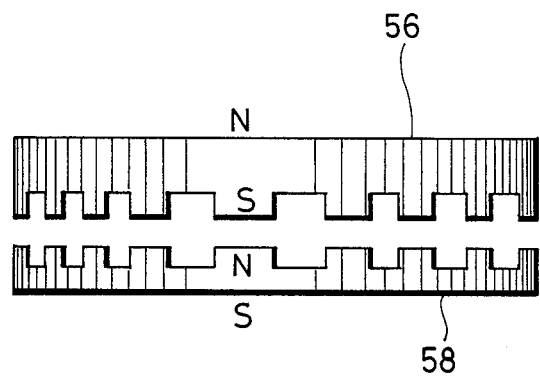
FIG. 2 illustrates a side elevation of one preferred embodiment of magnets.

As shown in FIG. 2, disk permanent magnets having grooves provided on each opposing side can also be used for the above mentioned permanent magnets.

Referring to FIG. 1, a motor 60 for rotatably driving the second internal cylinder 28 is furnished on the periphery at a lower portion of the tower 22, and at the top end of the tower is provided a revolution sensor 62 to be used for detecting revolutions of the first external cylinder 26.

Figure 3:
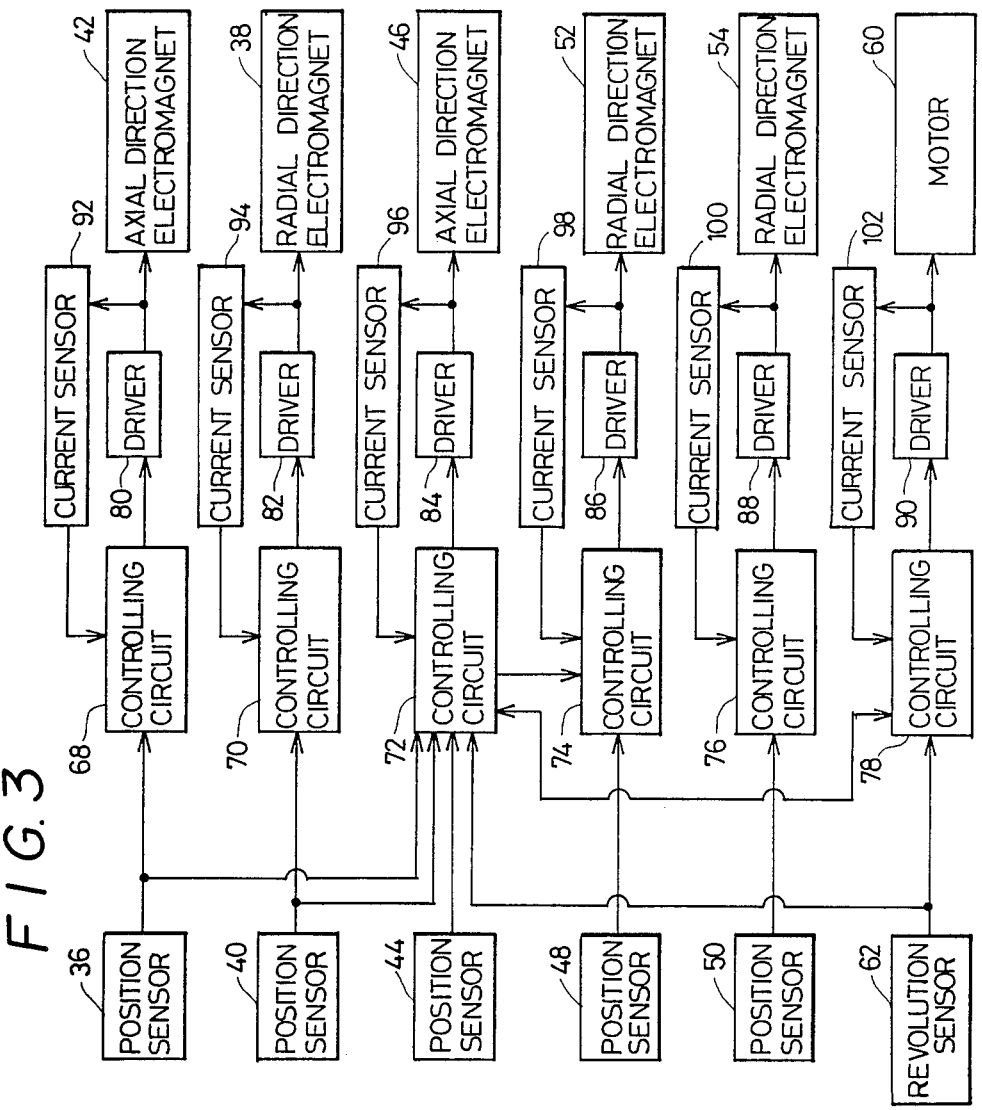
FIG. 3 is a block diagram showing a controlling apparatus for the pump body.

Through a connector 64 and cables 66 provided at the bottom of the pump body, the position sensor 36, axial direction electromagnet 42, position sensor 40, radial direction electromagnet 38, position sensor 44, axial direction electromagnet 46, position sensor 48, position sensor 50, radial direction electromagnet 52, radial direction electromagnet 54, motor 60 and revolution sensor 62 are connected to control circuits as shown in FIG. 3. In FIG. 3, detected signals from the position sensors 36, 40, 44, 48 and 50 and the revolution sensor 62 are fed respectively to controlling circuits 68, 70, 72, 74, 76 and 78, and the controlling signals therefrom are respectively fed to drivers 80, 82, 84, 86, 88 and 90. Further, the electromagnets 38, 42, 46, 52 and 54 and the motor 60 are driven by the drivers 80, 82, 84, 86, 88 and 90. Driving currents thereof are detected by sensors 92, 94, 96, 98, 100 and 102.

When the pump operation is started by feeding power to the controlling equipment, currents running through the electromagnets 42, 38 and 54 are respectively controlled by the controlling circuits 68, 70 and 76 according to detected signals from the position sensors 36, 40 and 50. Consequently, the first internal cylinder 26 and the second internal cylinder 28 joined together by the permanent magnets 56 and 58 are magnetically suspended. While they are magnetically suspended, the controlling circuit 72 controls current running through the axial direction electromagnet 46 in response to detected signals from the position sensor 44 for detaching the second internal cylinder 28 from the first internal cylinder 26 against the pulling force acting between the permanent magnets 56 and 58.

At the same time, current running through the radius direction electromagnet 52 is controlled by the controlling circuit 74 in response to detected signals from the position sensor 48 to stabilize the position of the second internal cylinder 28.

Upon receiving a signal from the controlling circuit 72 representing detachment of the first internal cylinder 26, the controlling circuit 78 starts revolution control of the motor 60.

When the revolution is started, since the first internal cylinder 26 is detached from the second internal cylinder 28, only the second internal cylinder 28 is driven by the motor 60.

At this stage, since the pump interior is at atmospheric pressure, pump operation is mainly carried out by the centrifugal blades 34 and stator blades 32. When the revolution speed of the motor 60 is increased by the controlling circuit 78, the stationary helical groove 29 starts functioning to thereby further increase the degree of vacuum.

When the controlling circuit 78 confirms, according to the driving current to the motor 60 detected by the sensor 102, that the pressure at the inlet port 12 becomes $10^{-3}$ torr or below, this information is transmitted to the controlling circuit 72.

The controlling circuit 72 controls the current running through the axial direction electromagnet 46 in such a manner that the revolution speed of the first internal cylinder 26 detected of revolution sensor 62 becomes closer to the revolution speed of the second internal cylinder 28 under the command of the controlling circuit 78. Namely, the running current is gradually decreased to narrow the gap between the permanent magnets 56 and 58 so that the revolution force of the second cylinder 28 is transmitted to the first cylinder 26. For the transmission of the revolution force, eddy current generated within the first cylinder 26 by the revolution of the permanent magnet 58 may also be used in addition to the pulling force acting between the permanent magnets 56 and 58. It should be noted that electromagnets can also be used instead of these permanent magnets.

Through this control, the second internal cylinder 28 moves closer to the first internal cylinder 26. When the revolution speed of the first internal cylinder 26 becomes the same as that of the second internal cylinder 28, the first internal cylinder 26 and the second internal cylinder 28 are completely connected. At this moment, the current running through the electromagnets 46 and 52 becomes almost zero.

When the first internal cylinder 26 and the second internal cylinder 28 are connected, this information is transmitted from the controlling circuit 72 to the controlling circuit 78 to thereby increase the revolution speed of the motor 60 to the optimum revolution of the turbo molecular pump portion 16.

As a result, the degree of vacuum at the inlet port 12 is increased to a high vacuum level of $10^{-3}$ to $10^{-10}$ torr. Air-tightness between the up-stream side and down-stream side of the second internal cylinder 28 is secured with magnetic fluid sealing 104 as shown in FIG. 1. The magnetic fluid sealing can also function as a damper at the moment of the connection of the rotor blades 28.

The air-tightness can also be secured by forming the opposing surfaces of the tower 22 and the second internal cylinder 28 in such a configuration so as to be able to obtain the labyrinth effect.

According to the embodiment of the present invention as described hereabove, only the centrifugal blade portion 20 mainly functions at the start of the pump operation. Then, as the revolution speed of the rotor increases, the stationary helical groove portion 18 starts functioning. When the degree of vacuum at the inlet port 12 is increased to an intermediate to high vacuum level ($10^{-3}$ torr), the second internal cylinder 28 and the first internal cylinder 26 are connected. The degree of vacuum at the inlet port 12 is increased by the pump operation of the rotor blades 27 of the rotor to $10^{-10}$ torr.

Since the pump operation ranging from the atmospheric pressure to an ultra high vacuum is possible by one single pump, its installation space can greatly be reduced; and since it is perfectly oil-free, its maintenance, handling and operation can be simplified. In addition, since the operation of turbo molecular pump portion 16 is started when the degree of vacuum reaches $10^{-3}$ torr, a large capacity is not required for the motor 60.

According to the invention as described above, a first set of blades for producing an ultra high vacuum and a second set of blades for producing low to high vacuum are coaxially provided. The first set of rotor blades is disconnected from the second set of rotor blades in a low vacuum range, and is connected in an ultra high vacuum range. Because of this feature, the pump operation ranging from a low vacuum range up to an ultra high vacuum range can be done by a single pump without having to increase the load of the motor, and the area needed for pump installation is therefore greatly reduced. Further, as it is a completely oil-free pump, its handling, maintenance and operation are facilitated.

What is claimed is:

1. A pump for producing ultra high vacuum comprising: a housing; a first rotor within said housing having a first set of rotor blades disposed around said first rotor for coaxial with said first rotor within said housing producing ultra high vacuum; a second rotor having a second set of rotor blades disposed around said second rotor for producing relatively low to high vacuum; magnetic suspension means for magnetically suspending said first rotor and said second rotor for rotation with said housing; a motor for rotationally driving at least said second rotor; and magnetic clutch means for coupling said first rotor and said second rotor when a predeterminined level of vacuum is reached.

2. A pump for producing ultra high vacuum according to claim 1, wherein said housing comprises a first set of stator blades provided on the inner periphery thereof to be paired with said first set of rotor blades, a second set of stator blades provided on the inner periphery thereof to be paired with said second set of rotor blades and a helical stationary flow groove provided on the inner periphery thereof between said first set of stator blades and said second set of stator blades.

3. A pump for producing an ultra high vacuum comprising:

a housing;

first and second coaxial rotors rotatably mounted within said housing, said first rotor being rotatable within a high vacuum portion of said housing and said second rotor being rotatable within a relatively lower vacuum portion of said housing;

means for magnetically suspending said first and second rotors for rotation within said housing;

means for detecting the relative axial positions of said first and second rotors;

magnetic means located on proximal ends of said first and second rotors for producing an attractive magnetic interaction therebetween so as to engage said rotors together; and electromagnetic means located respectively on proximal ends of said first and second rotors for periodically producing a repelling magnetic interaction therebetween so as to disengage said rotors.

4. A pump according to claim 3, wherein said magnetic means for providing an attractive magnetic interaction comprises first and second permanent magnets.

5. A pump according to claim 4, wherein said permanent magnets comprise two rings of permanent magnet having grooves provided on each opposing side thereof.

6. A pump according to claim 3, wherein said magnetic means for providing an attractive magnetic interaction comprises first and second electromagnets.

7. The pump of claim 3, comprising:

means for detecting the rotational speed of said first rotor;

means for determining when said rotational speed reaches a predetermined speed; and means for actuating one of said magnetic and electromagnetic means when said rotational speed reaches said predetermined speed so as to cause said first and second rotors to engage together.

8. The pump of claim 3, in which said detecting means comprises at least one position sensor provided for each of said first and second rotors.

9. The pump of claim 3, in which the electromagnetic means includes means for producing a repelling magnetic interaction sufficient to overcome the attractive magnetic interaction of said magnetic means.

10. The pump of claim 3, in which said means for magnetically suspending comprises at least one position sensor to monitor the relative axial positions of said first and second rotors.

11. The pump of claim 3, in which said first and second rotors are each provided with a set of corresponding rotor blades disposed therearound.

* * * * *